(12) United States Patent
Armour (10) Patent No.: US 8,968,568 B2
(45) Date of Patent: Mar. 3, 2015

(54) WATER FILTRATION SYSTEM

(71) Applicant: John A. Armour, Jacksonville, FL (US)

(72) Inventor: John A. Armour, Jacksonville, FL (US)

(*) Notice: Subject to any disclaimer, the term of this patent is extended or adjusted under 35 U.S.C. 154(b) by 0 days.

(21) Appl. No.: 13/667,712

(22) Filed: Nov. 2, 2012

(65) Prior Publication Data

US 2013/0055794 A1  Mar. 7, 2013

Related U.S. Application Data

(60) Division of application No. 13/096,738, filed on Apr. 28, 2011, now Pat. No. 8,318,021, which is a continuation of application No. 12/317,929, filed on Dec. 30, 2008, now abandoned, which is a continuation of application No. 11/772,051, filed on Jun. 29, 2007, now abandoned.

(60) Provisional application No. 60/817,743, filed on Jun. 30, 2006.

(51) Int. Cl.
*B01D 65/10* (2006.01)
*G01N 15/08* (2006.01)
*H04N 7/01* (2006.01)

(52) U.S. Cl.
CPC .............. *H04N 7/0115* (2013.01); *H04N 7/012* (2013.01)
USPC ............. 210/636; 73/38; 73/40; 73/40.7; 210/741

(58) Field of Classification Search
CPC ........... G01N 7/00; G01N 7/10; G01N 15/08; G01N 2015/084; G01N 2015/086; B01D 65/10; B01D 65/102; B01D 65/104
USPC .......... 73/38.4, 40.7; 210/90, 321.87, 321.89, 210/636, 650, 741, 798
See application file for complete search history.

(56) References Cited

U.S. PATENT DOCUMENTS

| | | | | |
|---|---|---|---|---|
| 4,872,974 A | * | 10/1989 | Hirayama et al. | 210/90 |
| 5,353,630 A | * | 10/1994 | Soda et al. | 73/38 |
| 5,401,397 A | | 3/1995 | Moorehead | |
| 5,594,161 A | * | 1/1997 | Randhahn et al. | 73/38 |
| 6,001,254 A | | 12/1999 | Espenan et al. | |
| 6,009,404 A | * | 12/1999 | Eimer | 705/7.12 |
| 6,324,898 B1 | * | 12/2001 | Cote et al. | 73/38 |

(Continued)

OTHER PUBLICATIONS

Warren Johnson, "Predicting log removal performance of membrane systems using in-situ integrity testing", Filtration & Separation, vol. 35, Issue I, Jan.-Feb. 1998, pp. 26-29.*

(Continued)

*Primary Examiner* — Joseph Drodge
(74) *Attorney, Agent, or Firm* — Ferris H. Lander, Inc.

(57) ABSTRACT

A water or liquid substance filtration device is disclosed which removes microorganisms and organic contamination and sterilizes the containers and water lines after the unit. The unit is portable, or can be mounted stationary. The unit has a five-stage filtration and sterilization system controlled by an independent onboard computer system that can link to a central computer system to keep track of all independent units. The unit will physically filter out of the water contaminants that can be reused, destroyed, or flushed down a safe drain. It can also be modified to filter for a certain size of particulate, making recovery of certain substances possible. The unit has a self-diagnostic system that can determine if the unit is operating properly and can shut down a part thereof if one of the capillary units fails. The unit uses ozone to disinfect containers and water lines.

3 Claims, 6 Drawing Sheets

(56) References Cited

U.S. PATENT DOCUMENTS

| | | | |
|---|---|---|---|
| 6,709,599 | B1 | 3/2004 | Rosenberger et al. |
| 7,040,512 | B2 * | 5/2006 | Tanny et al. ............. 222/189.11 |
| 7,281,409 | B2 * | 10/2007 | Baumfalk et al. ................. 73/38 |
| 7,360,400 | B2 * | 4/2008 | Baumfalk et al. ................. 73/38 |
| 7,587,927 | B2 * | 9/2009 | Burke et al. ...................... 73/38 |
| 7,594,425 | B2 * | 9/2009 | Lewnard et al. .................. 73/38 |
| 2002/0027111 | A1 | 3/2002 | Ando et al. |
| 2004/0262205 | A1 | 12/2004 | Binau |
| 2005/0033646 | A1 * | 2/2005 | Crisp, III ........................ 705/16 |
| 2008/0093277 | A1 | 4/2008 | Armour |
| 2009/0301951 | A1 | 12/2009 | Armour |

OTHER PUBLICATIONS

Abstract for the publication:Warren Johnson, "Predicting log removal performance of membrane systems using in-situ integrity testing", Filtration & Separation, vol. 35, Issue I, Jan.-Feb. 1998, pp. 26-29.*

* cited by examiner

WATER FILTRATION SYSTEM

CROSS REFERENCE TO RELATED APPLICATIONS

This application is a divisional of U.S. patent application Ser. No. 13/096,738, filed Apr. 28, 2011, now U.S. Pat. No. 8,321,021, issued Apr. 28, 2011, which is a continuation of U.S. patent application Ser. No. 12/317,929, filed Dec. 30, 2008, now abandoned, which is a continuation of U.S. patent application Ser. No. 11/772,051, filed Jun. 29, 2007, now abandoned, which claims the benefit of U.S. Provisional patent application No. 60/817,743, filed Jun. 30, 2006, the disclosures of which are hereby incorporated by reference.

FIELD OF THE INVENTION

This invention relates to the combination of several technologies for cleaning water or other liquids or media. One aspect of the invention relates to a back flushing/washing system for capillary membrane systems. The back flushing system can be operated by hand or can be completely computer automated. The system can be used on an industrial, commercial, public utility, or domestic level, especially for producing drinking water. The system is easily transportable and can be mounted at a permanent location. The system can clean "gray" and "black" water.

BACKGROUND OF THE INVENTION

Many of the devices for filtering water are extremely large and bulky, and do not provide safety from bacteria and viruses in drinking water. Some of the products that do achieve these goals are for individual or small-scale use, for example, at a faucet or sink. With the growing threat of bacterial and viral content in water, it is necessary to make sure all the water coming into a home is safe. Commercial businesses need even larger volumes of clean water for production and drinking. Public utilities are struggling to provide safe water with an ever-increasing labor cost. Industry needs to be able to filter not only the water that comes in for usage, but to have systems that they can rely on to effectively remove micro-organisms, particles, and molecules for the safe discharge of water into the environment (for example, as mandated by the United States Environmental Protection Agency).

Embodiments of the present invention address the foregoing and other needs. Systems in accordance with such embodiments produce, for example, drinking water having a quality which exceeds conventional and applicable standards in place at the present time.

SUMMARY OF THE INVENTION

Embodiments of the invention comprise a system which physically filters bacteria, viruses, particles, and molecules from water, or other liquids or media.

In an aspect of the invention, computer technology is used to make cleaning of water easy for the consumer without the worry that the equipment is being successfully operated by their employees.

In an embodiment, a water filtration system comprises: an input line for receiving water to be filtered; an output line for discharging filtered water; a containment line for discharging backflush water; a first capillary filter having a first port at first capillary end and a second port at a second capillary end and a third port between capillary ends; a first valve between the first port and the input line; a second valve between the second port and the containment line; and a third valve between the third port and the output line.

In another embodiment, a water filtration system comprises: an input line for receiving water to be filtered; an output line for discharging filtered water; a containment line for discharging backflush water; a first capillary filter and a second capillary filter, where each capillary filter comprises a first port at first capillary end and a second port at a second capillary end and a third port between capillary ends; a first valve between the first port of the first capillary filter and the input line; a second valve between the first port of the second capillary filter and the input line; a third valve between the second port of the first capillary filter and the containment line; a fourth valve between the second port of the second capillary filter and the containment line; a fifth valve between the third port of the first capillary filter and the output line; and a sixth third valve between the third port of the second capillary filter and the output line.

BRIEF DESCRIPTION OF THE DRAWINGS

A more complete understanding of the method and apparatus disclosed herein may be obtained by reference to the following detailed description in conjunction with the accompanying drawings wherein.

DETAILED DESCRIPTION OF THE DRAWINGS

Figure 1:
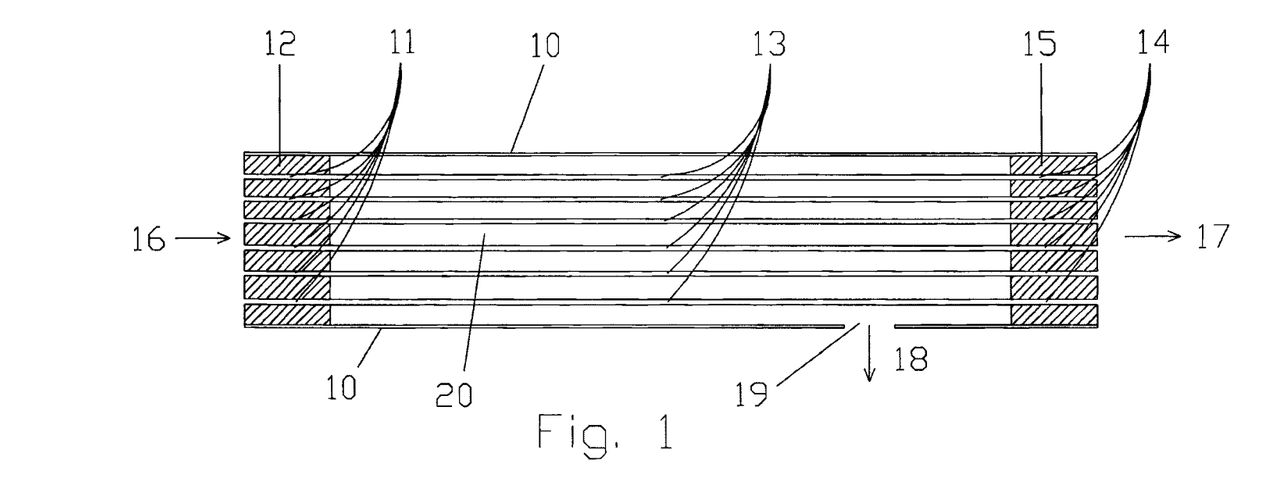
FIG. 1 shows a diagram of a filter for use in the present invention.

FIG. 1 shows an internal diagram of a capillary system-based filter for use in the present invention. In FIG. 1, the filter housing 10 can be any shape, and can be made of many materials. The preferred material of choice is PVC pipe. The pipe in this usage is, for example, about two inches in diameter and about sixteen inches long. The ends of the pipe can be threaded for pipe fittings or the fittings can be glued as is conventionally known. Other similar connection devices known to those skilled in the art could alternatively be used. The inlet connection end 16 and waste outlet connection end 17 could be reversed without any effect on the outcome, but for this example and description will be named as such.

A bundle of capillary membranes 13 are fitted into the housing 10 and extend from end 16 to end 17. The capillary membranes may comprise 1000 to 1200 individual capillary membranes, which are available from X-FLOW B.V., PO Box 739, 7500 AS ENSCHEDE, The Netherlands. Both ends 16 and 17 are identical in that the portions 11 and 14 of the capillary membranes 13 are open on each end. Each end has a capillary membrane holder 12 and 15 made of a resin, such as an epoxy or polyurethane. The media to be filtered (for example, water) flows into the filter end 16 and would be temporarily blocked at the filter end 17. Thus, the media would flow through the walls of the capillary membrane tubes 13 (starting at the portion 11) and flow into the open area of 20 within the housing 10 (and between the membranes 13). Because end 17 is blocked, the media would exit 18 the filter housing 10 through exit port 19.

In a back flush procedure, the media flow would be reversed (with end 16 being blocked off and end 17 opened to allow for flow. For example, end 17, when opened, could be connected to a drain or storage tank. A more complete discussion of the back flush procedure is provided in connection with the FIG. 3.

Figure 2:
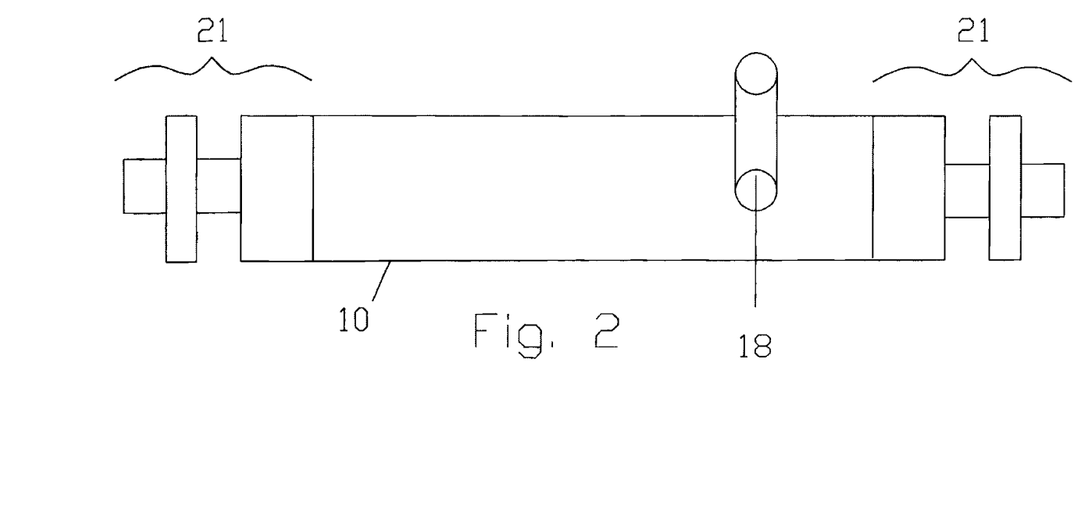
FIG. 2 shows a side view of the filter of FIG. 1.

FIG. 2 shows a side view of the filter with a housing of choice. Again, housing 10 is made of PVC pipe with an outlet tube covering the open port 18. Each end has a fitting joined to the PVC pipe and reduced down to a smaller pipe connected to a ¾ inch union. Although not shown, a union to the pipe is provided with respect to port 18. Thus, with 20 the disclosed unions, the filter unit can be replaced easily in case the filter breaks or is damaged.

Figure 3:
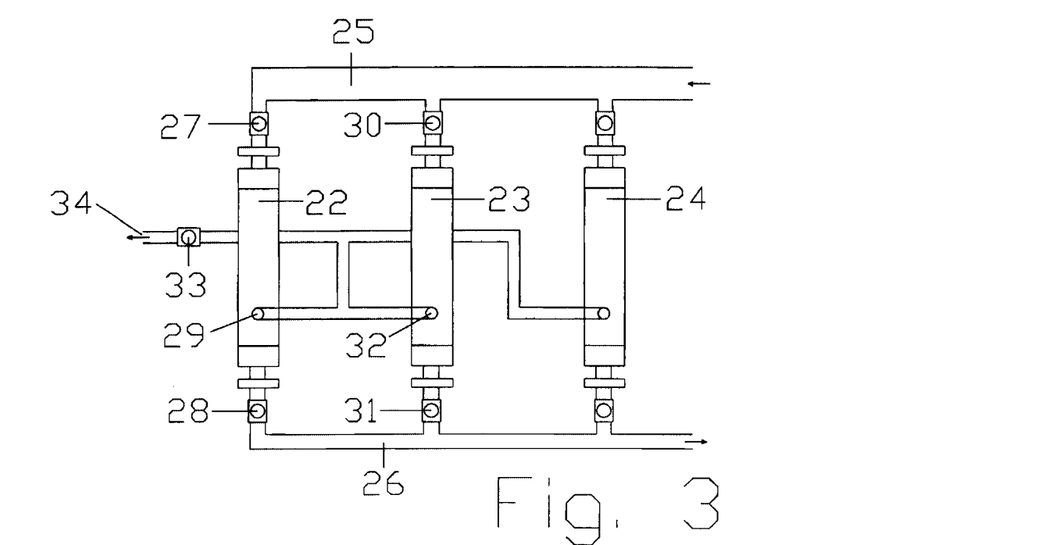
FIG. 3 is a diagram of a filter system.

FIG. 3 is a diagram of a filter system. The system uses a first filter 22 and a second filter 23, which are connected in parallel to each other. The filters 22/23 are of the configuration illustrated in FIGS. 1 and 2. The first ends of the filters 22/23 are connected to a supply line 25. The second ends of the filters 22/23 are connected to a drain or containment line 26. Clean water outlet ports 29 and 32 (corresponding to port 18) are connected together and to a clean water outlet line 34. A number of controllable valves are provided. A first set of valves 27/30 selectively connect the fast ends of the filters 22/23 to the supply line 25. A second set of valves 28/31 selectively connect the second ends of the filters 22/23 to the drain or containment line 26. A third valve 33 selectively connects the outlet ports 29 and 32 to the clean water outlet line 34.

In normal operation of the system shown in FIG. 3, valves 27, 30, and 33 would be in the open position, while valves 28 and 31 would be in the closed position. This allows the water from line 25 to flow through the filters 22/23 and out to the clean water outlet 34. In order to back flush the filter 22, valves 27 and 33 would be closed. Valve 28 would be opened. In this mode, water would continue to flow from water supply 25 into filter 23 and out port 32. The water from port 32 would then flow backward into port 29 and through filter 22. The effect of this would be to push the filtered material away from the inside of the capillary membranes of filter 22 and out the drain valve 28 into line 26. After 3 to 30 seconds of operation with respect to back flushing filter 22, the valves would all be returned to normal operation. Next, to back flush filter 23, the procedure as described above would be implemented with respect to filter 23. So, valves 30 and 33 would be closed; and valve 31 would be opened This allows water to flow from water supply 25 into filter 22 and out through port 29, then flow in a backward direction into port 32, through filter 23 and out past valve 31 into drain or containment line 26. After 3 to 30 seconds all valves would return to normal operation positions. It will be noted that the system of FIG. 3 further shows the presence of a third filter 24. This disclosure is made to suggest that the system may implement the placement of numerous filters in parallel connection, and each would be back flushed in the same manner the filters 22/23 with sequential operations.

When multiple filters are present and connected in parallel in the system, these filters will create more than enough flow to not only back flush any one other filter but still provide enough flow for supply outlet 34. Thus, in an enhancement from the process discussed above, there may not be a need during the back flushing operation to shut valve 33.

It will also be noted that a possible way to back flush would be to simply open valve 28 or 31. While such a process is possible, it is not preferred since it does not give as good a back flush as pushing the filtered material away from the inside walls of the capillary membranes, and then flushing them as described above.

Another back flushing design is similar, and uses existing filters 22 and 23 developed by Prime Water International. These filters only have one end of the capillary tubes open, and one end closed. These can also be configured in a back flush design shown in FIG. 4. In normal operation, valves 27, 30 and 33 would be in the open position, and valves 28 and 31 would be closed. Water supply 25 would feed water to filter 22 and 23, through the capillary tubes into outlets 29 and 32 to clean water outlet 34. To back flush filter 22, valves 27 and 33 would close. Valve 28 would open, letting water flow from water supply 25, through filter 23, out port 32, backwards down line into port 29, and backward through filter 22 and out past open valve 28 into the drain or containment line 26. After 3 to 30 seconds, the valves would be returned to the normal operation mode. To back flush filter 23, valves 30 and 33 would close. Valve 31 would open, letting water from water supply line 25 flow through filter 22, out port 29 into line 34, backwards through port 32 into filter 23, and past open valve 31 into the drain or containment line 26. After 3 to 30 seconds all valves would be returned to the normal operation mode. And again, if more than 2 filters are hooked up in parallel, the flow would be more than enough to back flush one filter and supply water to clean water outlet 34, thus enabling one to keep valve 33 open during back flushing.

Figure 5:
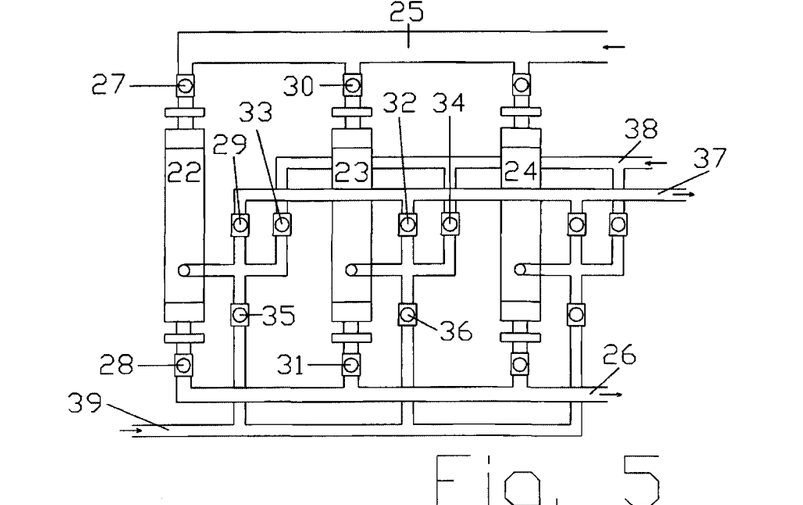
FIG. 5 shows a sterilization and integrity testing back flushing setup.

FIG. 5 shows a sterilization and integrity testing back flushing setup. Normal flow of water comes down supply pipe 25, and into the filters 22/23 through open valves 27 and 30. Valves 28, 31, 33, 34, 35, and 36 are closed. Valves 29 and 32 are open. Water flows through the filters 22/23 and out valves 29 and 32 down pipe 37. Pipe 37 leads to an ultra violet light, which kills any live particles that might be alive and then to an ozone light which puts ozone into the water. After this process, the water returns back into pipe 38, sterile and full of bacteria and viral killing ozone. When it is time to back flush, this water comes backward through the filters 22/23 via open valves 33/34, pushing off the collected bacteria and viruses from the inside of the capillary tubes, and killing any that try to grow or stick to the inside of the tubes. The filter life and flow is greatly increased due to using this sterilized water with ozone. When back flushing filter 22, the valves 27 and 29 close, while valves 33 and waste valve 28 are open. The water would flow from filter 23, (and also filter 24, and as many filters as are in parallel), down line 37 through the ultra violet light and the ozone light, then come back in line 38, through open valve 33, flushing filter 22 out valve 28 to drain line 26. This back flush should be run for about 3 to 30 seconds. Then all valves are returned to normal operation mode. To back flush filter 23, valves 30 and 32 are closed, and valves 34 and 31 are opened This would allow the water down flow from filter 22, and the other normally operating filters, (24, etc.) into line 37, through the ultra violet light and the ozone light, then come back in line 38, through open valve 34, flushing filter 23 out valve 31 to drain line 26. Again, the flushing should run for about 3 to 30 seconds and then return the valves to normal mode. This same process continues sequentially for as many filters as are provided in parallel down the system processing line. Preferably, not more than one filter should be back flushed at one time.

One of the most important aspects of these filters is the fact that once water has gone through the capillary tubes, water can flow backwards but when air is forced backwards the filter will not let air backwards through the filter, essentially causing the filter to "lock up". This is beneficial when operating this equipment due to the fact that unless one of the capillary tubes is broken, the filter will hold air pressure. If the pressure drops, it proves one of the capillary tubes are broken, which would let unfiltered water through in small amounts. Line 39 comes from an air compressor. When this integrity test is initiated for filter 22, valves 27, 29, and 33 are closed or stay closed, valves 28 and 35 are opened allowing all the water to be pushed backward by the air coming through valve 35. When all the water is pushed out, the filter will hold air pressure at a constant pressure. About 10 to 15 pounds of air pressure gives the filter a good test. This pressure should be held for 60 seconds to ensure a true test of the filters soundness. After taking the air pressure test, all valves return to normal operation mode, and the next filter can be tested in the same manner, until all filters are tested. For filter 23, valves 30, 32, and 34 are closed. Valves 31 and 36 are open. Hold air pressure for 60 seconds, measure, and return valves to normal operation mode. If one filter were found to be broken, all valves would be turned off to that filter and the rest of the filters could continue filtering without shutting down the whole system for repairs.

Figure 7:
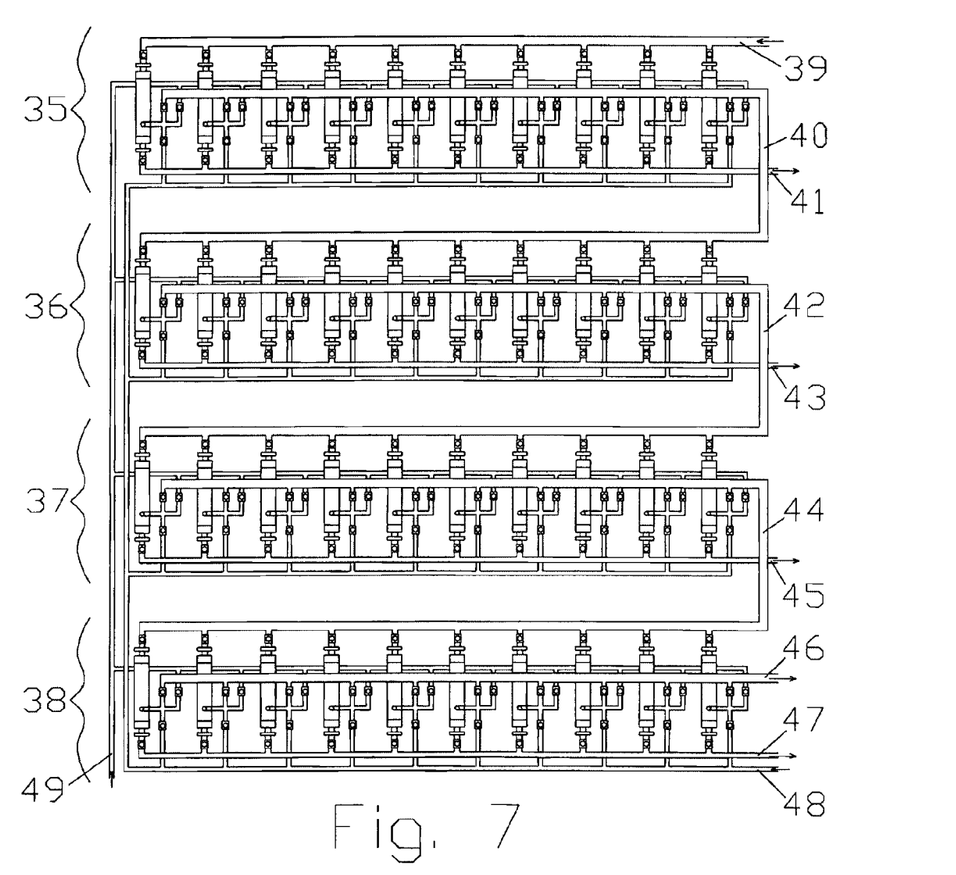
FIG. 7 is a diagram for the arrangement of filters for an industrial application filter system.
Figure 8:
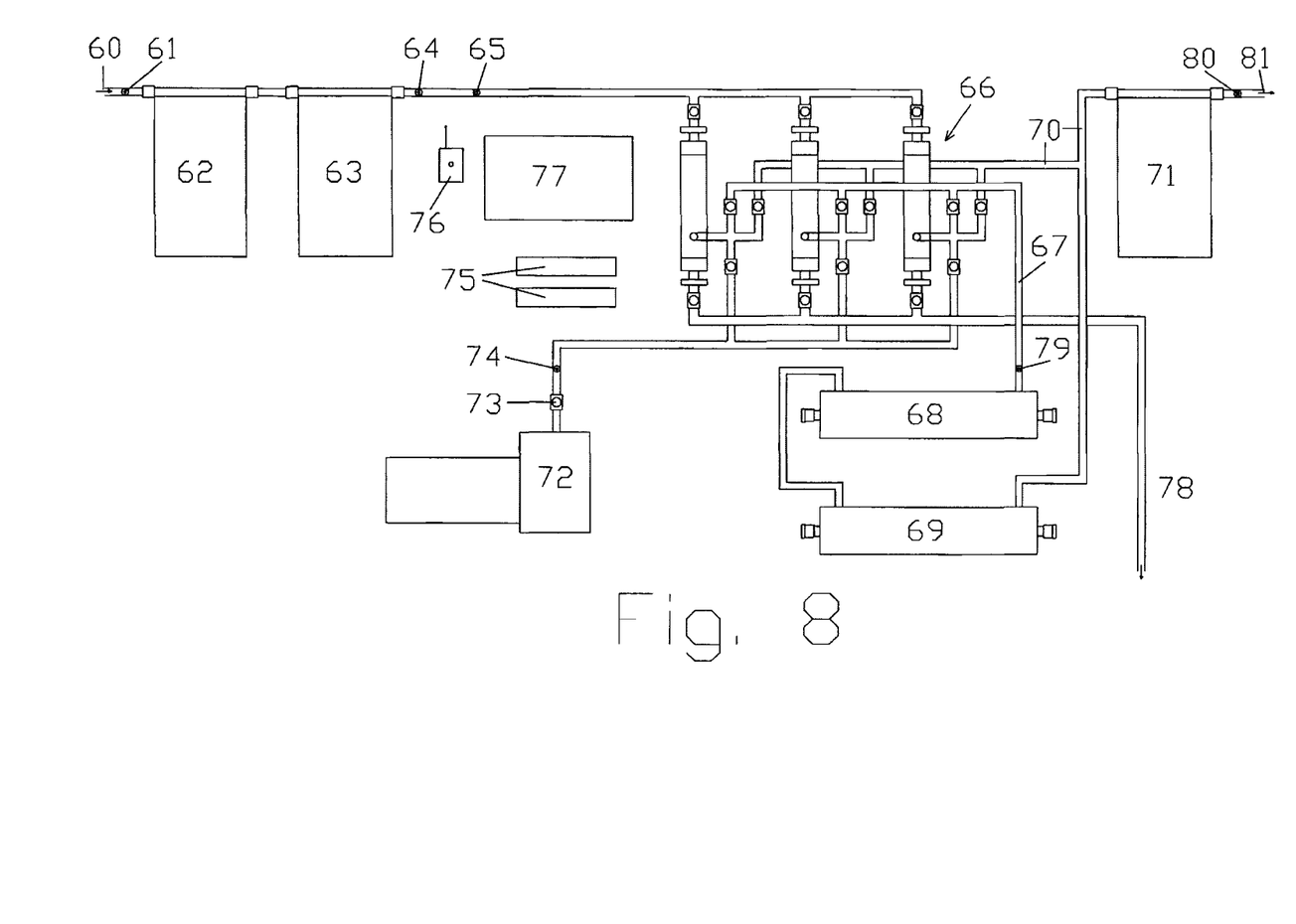
FIG. 8 is a diagram of a whole house automated filter system.
Figure 9:
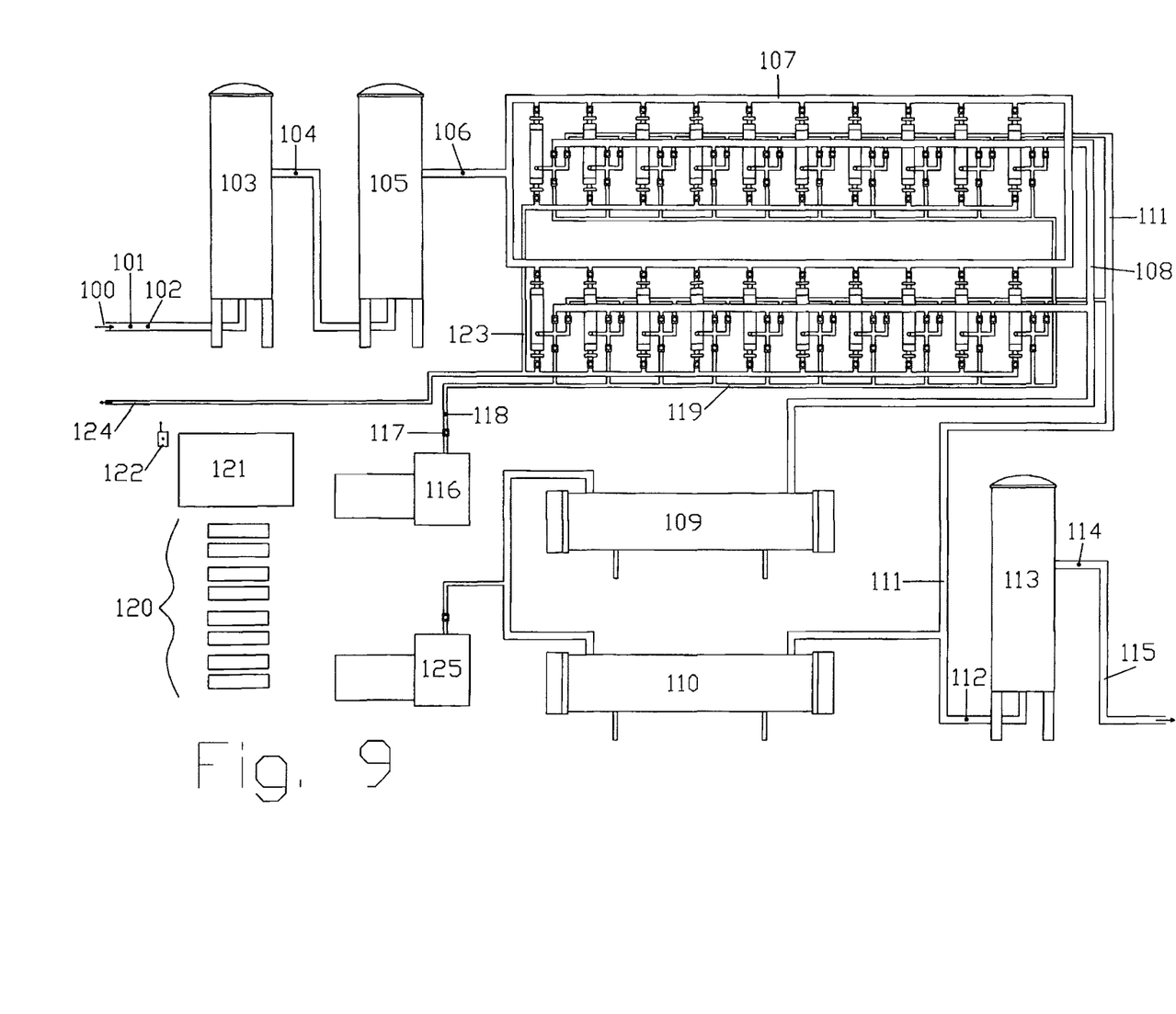
FIG. 9 is a diagram of a large commercial water unit automated filter system.

In computer operated and controlled versions of the system, such as those systems shown in FIGS. 7, 8 and 9, the drop in pressure can be sensed and the computer would send an alert to the main monitoring computer, telling of the error. Responsive to the error notification, parts and repairs can be scheduled by the computerized system automatically.

The equipment to run about 5 gallons of water per minute is fairly compact, and can be arranged in a large suitcase, such as a suitcase, which fits within airline requirements for maximum size, weight and dimensions. This is enough water to provide for a family or group going to a location with questionable water quality.

Figure 6:
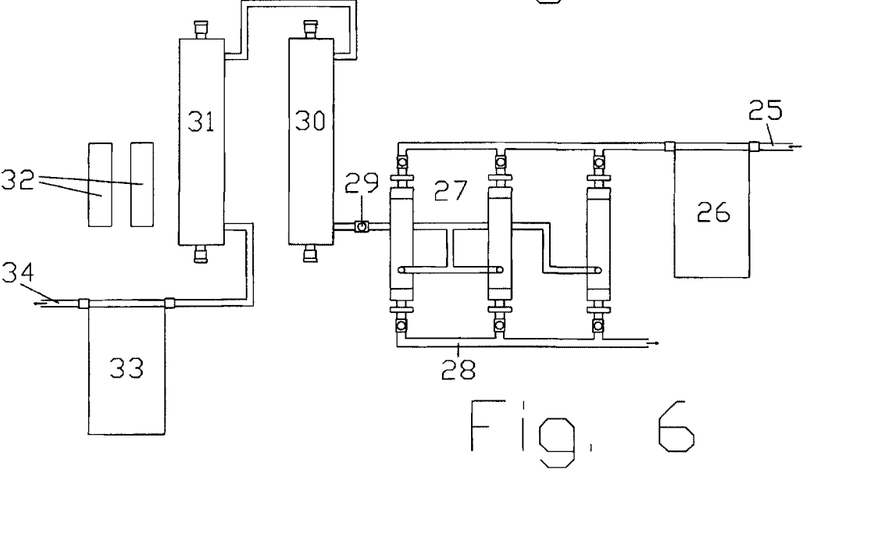
FIG. 6 is a diagram of a filter system.

A system with a configuration to provide about 5 gallons of water per minute is shown in FIG. 6. Reference 25 refers to the water supply (for example, for the house). The supplied water first goes into and through filter 26 to remove larger particles than 1 micron. Filter 26 may comprise, for example, a spin down type filter housing with a 1-micron filter as provided by OMNIFILTER of Delavan, Wis. After this filtering operation, the water passes on to the system of capillary filters and using the process as shown and discussed in connection with FIG. 3. The waste goes out the waste line 28 to a safe drain, and the filtered water goes on through valve 29 and to a small ultra-violet sterilizer 30. The sterilizer 30 may comprise a S5Q-P U/V device provided by Sterilight. From sterilizer 30 the water passes into a small ozone generator 31. The ozone generator 31 may comprise a S5Q-P 0 device provided by Sterilight. After that, the water passes through a carbon filter 33 to absorb any chlorine or other chemicals too small for the capillary filters to filter. The filter 33 may comprise a spin down type filter housing device provided by OMNIFILTER of Delavan, Wis. After the filter 33 processes the water, the water can be collected and for a few minutes the ozone in the water will kill any bacteria or viruses in the containers. The reference 32 refers to the ballasts used for the ultra-violet light sterilizer 30 and the ozone generator 31.

It will be noted that the ultra violet light sterilizer 30 and the ozone generator 31 require electricity to run. Thus, the system should preferably be operated where there is access to electricity. Notwithstanding the foregoing, the system is capable of being operated without electricity to turn on the devices 30/31. In some cases, these devices 30/31 could be eliminated from the system. This would save weight and provide a system operable where there will not be any electricity. Thus, it will be recognized that devices 30/31 are optional. However, it is preferred and highly suggested that this system include devices 30/31 so as to sterilize the water. Alternatively other processes may be used to sterilize water lines or water containers after the water is processed by the system.

In a first implementation of the system of FIG. 6, the included valves would be hand operated valves. It will be recognized, however, that electrically controllable valves could alternatively be provided and that the system could include a control device (such as a computer or logic controller) to operate the valves in normal and flush mode. It should also be noted that in the event there is not electricity available, that a hand pump could supply water from a lake or stream to inlet 25.

FIG. 7 is the diagram for the arrangement of filters for an industrial application where separation of certain molecules is desired. The capillary tubes can be made to certain specifications of size filtration. If a manufacturer wanted to retain a certain substance of a certain size, this system is easily modified to accomplish this.

Water with all material below 1 micron comes into filter set 35 through supply line 39. The capillary filters in filter set 35 are pre-built and configured to filter out undesired substances, which are just larger than a first desired retention. That which is the size of the first desired retention exits line 40 and flows to the capillary filters in next filter set 36. The waste (i.e., the undesired substances) may be back flushed using the same technique and method as described above in connection with FIG. 5, with the waste exiting the system through waste water line 41.

The capillary filters in filter set 36 are pre-built and configured to filter out the first desired substance. That which is smaller than the first desired retention exits line 42 and flows to the capillary filters in next filter set 37. The captured first desired substance may then be back flushed using the same technique and method as described above in connection with FIG. 5, with the desired substance exiting the system through containment water line 43.

The capillary filters in filter set 37 are pre-built and configured to filter out undesired substances, which are just larger than the second desired retention (which is smaller than the first desired retention). That which is the size of the second desired retention exits line 44 and flows to the capillary filters in next filter set 38. The waste (i.e., the undesired substances) may be back flushed using the same technique and method as described above in connection with FIG. 5, with the waste exiting the system through waste water line 45.

The capillary filters in filter set 38 are pre-built and configured to filter out second desired substance, which is just larger than any other substances that may remain in the water. That which is smaller than the second desired retention, exits line 46 and flows out of the system as filtered output.

The second desired retention (i.e., the second desired substance) may be back flushed using the same technique and method as described above in connection with FIG. 5, with the containment of the second desired substance exiting the system through containment water line 47.

It will be understood that the system of FIG. 7 is scalable in that one may include as many filter sets 35-38 as are desired. Furthermore, one may choose the desired retention of each filter set as necessary to achieve a certain filtering goal with respect to the output from each containment/waste line.

Line 48 provides the air pressure integrity test line. Line 49 provides a completely filtered water supply, for example completely filtered water from output 46, for back flushing of the filters, in each filter set as described above.

Back flushed output from lines 41 and 45 are sent to waste, while 43 and 47 may be sent to storage or for further refinement. This back flushed output would be in a concentrated form. As described above, the water for performing the back flush is preferably the water, which is provided from the output of the last filter set 38 in the series, or from further filter refinement of the water after line 46. In an embodiment, the back flushed output from lines 41 and 45 could be sent to a safe drain, while the back flushed output from lines 43 and 47 is sent to storage or for further refinement.

A whole house automated filter system is diagrammed in FIG. 8. Water comes from a public utility or personal well 60, and flows past pressure sensor 61. This sensor 61 monitors the pressure applied to the system. The water flows into a 5-micron filter 62, and then to a 1-micron filter 63. The filters 62 and may comprise, for example, spin down type filter housings with a 5-micron filter and a 1-micron filter, respectively, as provided by OMNIFILTER of Delavan, Wis. It will be understood that a single input filter could alternatively be used (see, for example, filter 26 of FIG. 6). However, by splitting the filter into two sizes, the included individual filters will be more likely to effectively operate for a longer period of time than a single filter. It is preferred that the filter products used in the filters 62/63 be easily changeable, and thus any standard, readily available, industry pre filtration fiber can be used. The pre-filter output water then flows past a pressure sensor 64. A computer 77 operates to monitor actual pressure and a difference in pressure as measured by sensors 61 and 64. When the measured pressure metrics indicate that water flow has substantially changed and slowed, the computer 77 can generate an alert (and perhaps notify a central computer): The alert may, for example, comprise causing a filter change light located on the outside of the filter case to flash.

Another flow sensor 65 is provided. By monitoring the flow sensor 65, the computer can determine whether ultra violet and ozone processing (as discussed below) should be operating. More specifically, the ultra-violet and ozone processing operations are terminated (so as to save energy and wear and tear on the components, such as from lights. overheating and burning out) when the sensor 65 indicates that no measurable water is flowing. Such may occur, for example, at night or when the home or business is not occupied. Responsive to sensor 65 detection of water flow, the computer 77 will cause the ultra violet and ozone processing operations to be activated.

It will, of course, be understood that one may not need sensor 65 and instead use the output of sensor 64 in some situations.

Water then flows into the set of capillary filters 66. This system has three filters. Although only two are needed, the presence of an extra filter is desired in the system in case one of the filters should break or otherwise become inoperable. With the provided configuration, operation of the system would not be stopped and water could continue to be filtered and flow would continue for the house.

The back flush and integrity test procedures used in the system of FIG. 8 are the same as those used in FIG. 5 and described above. Back flush output 78 is preferably plumbed to a safe drain. An air compressor 72 provides air for the integrity test. This air flows from compressor 72 through valve 73 and past a pressure sensor 74 to the filter being tested. Once the system has been charged, the compressor 72 is turned off and the valve 73 shuts. During the pressure test, the pressure sensor 74 measures pressure with the measured, pressure being monitored by the computer 77. After the test has been completed, the valve 73 reopens and the system is discharged. The computer 77 monitors for pressure drops indicative of a leak and signals an alert if such is detected. The computer 77 controls initiation and performance of an integrity test.

An additional pressure sensor 79 is provided on the filtered water output line 67 from the filter set. The measured pressures at sensors 64 and 79 are monitored, and the pressure data is processed by the computer 77 to sense the need to perform a back flushing operation. For example, a pressure drop between sensor 64 and 79 of a certain magnitude/time would indicative of clogging in one or more of the filters in the filter set 66. Responsive thereto, the computer 77 can control valve actuation to cause a back flushing to be performed with respect to one or more of the filters.

The computer 77 further includes functionality to sense if the ultra violet or ozone bulb in the units 68 and 69 burns out. The computer 77 may further, upon detecting a broken or miss operating filter within the set 66, function to shut off that filter.

With respect to any of its monitoring, control and alerting functions, the computer 77 may further operate to alert (reference 76) the main computer via a cell call, Internet connection or land phone line, and turn on a service light on the front of the case.

After the filtered water passes through line 67 to the ultra-violet unit 68 and ozone light unit 69, the output line 70 splits with one line providing a pure water supply for the back flushing operations and a second line providing pure water to a carbon filter 71. At the output of filter 71, a sensor 80 measures pressure. The computer 77 receives pressure reports from sensor 80 and sensor 79. By monitoring and comparing the pressures at these two points of the system flow, the computer 77 can determine whether and when the carbon filter 71 needs to be changed Again, alarms and alerts as discussed above are provided by the computer 77 in response to such a detection.

The output clean water line 81 is hooked to the house's main water supply.

FIG. 9 is a large commercial water unit that is diagramed for 100 gallons per minute operation. Units can be customized larger or smaller to meet the needs of the customer. This unit will be a standard unit, mounted on an aluminum-framed pallet. The wall will be made of butcher board, screwed onto the framework of the pallet. Water comes into the system from water supply line 100, and then flows past a pressure sensor 101 and a flow sensor 102. The computer 121 manages these sensors, and have the same functions discussed in FIG. 8. Stage one of the filtration process uses known technology to clean the water to a 1 to 0.35 micron range, using a double chamber centrifuge type system with an angled pleat filter cartridge in the center of the unit like Harmsco hurricane filters. A separate centrifugal separator from the cartridge filter could be also used, but this will take up more space.

Water flows fast through hurricane unit 103, which filters at 1-micron and past sensor 104. The measured pressure difference between sensor 101 and 104 provides information evaluated by the computer 121 to determine whether and when to change filter 103. In hurricane unit 105, the filters will reduce particle size to 0.35-micron for output past sensor 106. The measured pressure difference between sensor 106 and 104 provides information evaluated by the computer 121 to determine whether and when to change filter 105.

A second stage of the filtering operation uses the capillary bank 107. In this embodiment, the bank is supplied by a circular water line so that input water pressure applied to each filter will be the same. Although a circular bank set-up is shown, a sequential series set up as in FIG. 7 could alternatively be used. Output water flows past sensor 112. The back flushing operation is the same procedure as discussed above in connection with FIG. 5 for each of the filters, which are connected in parallel. The determination as to when back flushing needs to be performed is made by the computer 121 by monitoring the pressure drop between sensors 106 and 112. Wastewater goes out line 123 to a safe drain 124 or containment tank (not shown). The air integrity test equipment is the same as that shown in FIG. 8 (116 is the air compressor, 117 is the holding valve that closes during the test, 118 is the pressure sensor, and 119 is the air feed line to each of the capillary filters). All these functions performed and monitored by computer 121 as described above.

Water flows from second stage to a third stage via clean water supply line 108. The third stage includes an ultraviolet processing unit 109 comprising an 8 bulb 115 gallon per minute ultra-violet light model uv 100 p built by Sterilight. Operation of the unit 109 is monitored by computer 121. The unit 109 includes four ballasts 120. This unit functions to kill biological or biological pieces that might get past the capillary filter bank and ensures safe water even in the event of a single broken capillary membrane. It is not necessary for the unit's function but is an extra backup.

A fourth stage of the system uses generally the same equipment as stage three except that the unit 110 is an ozone processing unit which is fitted with ozone producing lights 110 (also using ballasts 120). This unit 110 will kill biologicals and aid in the sterilization of the capillary filters. It should be noted here, that if there were an extreme amount of bacteria or viruses found in the incoming water, a Nikuni pump 125 or similar device such as made by World Water Works of Elmsford, N.Y., could be installed as an option to provide more dissolved air, or bottled oxygen to the system just before the ozone processing unit, thus greatly enhancing the ozone output. The water from stage four splits in line 111 to supply water back to the filters for back flush operation and into a line flowing past sensor 112 to a fifth stage hurricane carbon unit 113. The carbon unit 113 will absorb any chlorine or other substances remaining in the water after the other processes. A filter change for unit 113 will be detected by the computer 121 by monitoring pressure difference between sensors 112 and 114 (located at the output of the unit 113). The resulting filtered output water then flows through output line 115 for use or storage.

In summary, the computer 121 will keep track of the need to change filters for 103, 105, and 113, detect, perform and control all back flush operations, perform integrity tests for the capillary system 107, monitor and turn off when not in operation the ultra-violet and ozone lights, provide light and sound, visual and audible, alarms upon any failure, and keep the central computer notified of status such as volume of water filtered, systems checks, security issues, and alarms via an onboard cell phone, internet, or land phone line.

In an embodiment, a unit is provided which can remove contaminants from water using a modification of a bundle of tubular capillary ultra filtration membranes fitted into a filter housing, the capillary membranes being permanently hydrophilic, and having an asymmetric pore structure, wherein the capillary membranes are open at both ends and are held by a membrane holder, which closes off the space in between the capillary membranes and the filter housing. This configuration allows for a much improved back flushing procedure. This unit is shown in FIG. 1. The preferred housing is shown in FIG. 2.

Figure 4:
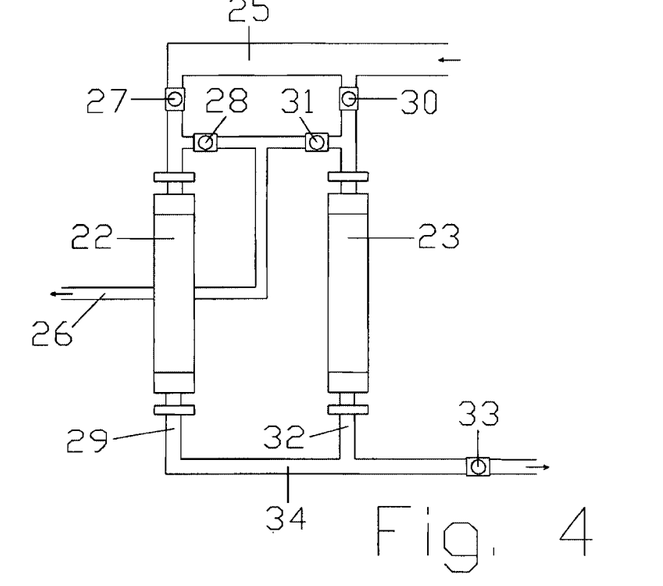
FIG. 4 illustrates a back flush design.

In an embodiment, a back flushing procedure is provided to flush the filter captured contaminants from the capillary membranes and storing them in a concentrated state. This is accomplished by using the clean water from one filter unit to back wash the other unit and vice versa. This back washing requires the use of at least two filter units, but filter systems can add as many additional units as are necessary in parallel to achieve a desired filtering flow rate. This procedure is shown in FIG. 3, with the three port filter shown in FIGS. 1 and 2. An alternate but similar method of back flushing using only two port, or dead end filters is shown in FIG. 4. FIG. 3 and FIG. 4 use single way valves, but could use three or four way valves instead. Note: two separate filters could be molded into the same body and have a port in the center, like 2 filters shown separately in these diagrams, but would still accomplish the same flow and results.

In an embodiment, a self-sterilization system and method of back flushing are shown in FIG. 5. Instead of taking the clean water from another capillary filter, the water is first collected, sent through an ultra-violet light for sterilization, then sent through an ozone generator light, and then back to the capillary filters for back flushing. The ozone kills bacteria and viruses on the dirty water side of the capillary membranes, causing them to release and flush instead of growing on the membrane surface and blocking flow. This configuration also includes a capillary integrity test that can be monitored by a computer.

In an embodiment, a, suitcase model design similar to the whole house design is shown in FIG. 6. This unit is sized for transport on airlines and vehicles and is the size of a large suitcase. This will greatly enhance safety in drinking water for travelers to regions where water is of questionable quality. This unit uses the backwashing process in FIG. 3, and all the valves in this unit would be operated by hand, with no computer. A small ultra-violet light and ozone generating light would be offered with the unit to sterilize containers after the unit, but is not necessary for the operation of the unit or the safety of the water produced.

In an embodiment, a second bank of filters operating in the same procedure as the first bank can be added to separate a certain particle size. The capillary membranes in the first bank can be sized to remove down to a set particle size, allowing the removal of larger particles. The second bank's capillary membranes can then be sized to remove the particle of desire, allowing smaller particles to pass on by. The back flushing procedure can then store the particles desired in a concentrated form. This system is shown in FIG. 7. If more than one particle size is desired, a third or forth bank (etc.) could be added for as many particles sizes to be separated as desired. It is advisable to use water that has come from the end sterilization process for the back flushing procedure. This would be more for industrial use of the back flushing process.

In an embodiment, a whole house design is shown in FIG. 8. This filter arrangement would use the same five-stage system used on larger units, complete with a computer monitoring system. All water coming into the house would go through the system, and the water lines would be sterilized by the ozone from after the unit.

In an embodiment, the commercial unit would also be used for a drinking or industrial water supply application, or to make "gray" or "black" water safely useable. This system is described in FIG. 9. The unit would be mounted on a portable framed aluminum or steel pallet, and in the five step example shown, produce 100 gallons of water per minute. This system is completely automated with an on board computer, linked to a central computer for monitoring. The volume of water is not restricted to just this example as custom equipment would follow the same procedure, size determined by the need of more or less water. The computer would also monitor security sensors, to alert the central computer of possible tampering of the water system, as a warning aid of a possible terrorist attempt to poison the water, or sabotage the system.

Although preferred embodiments of the apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A process for testing a tubular capillary membrane water filtration system including at least two separate capillary membrane filter housings having tubular capillary membranes fitted therein, said capillary membranes being permanently hydrophilic and having an asymmetric pore structure thereby allowing the passage of water in either a forward or backward direction across the membrane and not allowing the passage of air in a backward direction across the membrane, comprising:

reversing the water flow, by forcing air backwards through said capillary membrane filter housing until all of the water is pushed backward through the membrane causing the filter to lock up until a desired constant pressure is achieved and held within said filter housing;

monitoring said pressure as a function of time; and determining if a drop in said pressure is experienced;

whereby said drop in pressure is indicative of a loss of membrane integrity.

2. The process of claim 1 further including the step of incorporating a computer operated and controlled testing system to automatically test each capillary membrane filter housing, wherein any drop in pressure results in a membrane integrity failure.

3. The process of claim 2, further including the step of isolating a capillary membrane filter housing which has demonstrated a loss of membrane integrity, allowing remaining filter housings to continue their filtration process.

\* \* \* \* \*